United States Patent [19]

Schiel

[11] 4,440,077

[45] Apr. 3, 1984

[54] PRESS ROLLER WITH ADJUSTABLE BENDING CHARACTERISTICS

[75] Inventor: Christian Schiel, Heidenheim, Fed. Rep. of Germany

[73] Assignee: J. M. Voith GmbH, Fed. Rep. of Germany

[21] Appl. No.: 375,048

[22] Filed: May 5, 1982

[30] Foreign Application Priority Data

May 7, 1981 [DE] Fed. Rep. of Germany ....... 3118063

[51] Int. Cl.$^3$ ............................................... B30B 3/04
[52] U.S. Cl. ........................... 100/162 B; 29/113 AD; 29/116 AD
[58] Field of Search ......... 29/113 R, 113 AD, 116 R, 29/116 AD, 129; 100/162 B; 72/241

[56] References Cited

U.S. PATENT DOCUMENTS

| | | | |
|---|---|---|---|
| 3,196,520 | 7/1965 | Appenzeller | 29/116 AD |
| 3,362,055 | 1/1968 | Bryce | 29/113 AD |
| 3,703,862 | 11/1972 | Appenzeller | 29/113 AD X |
| 3,921,514 | 11/1975 | Biondetti | 100/162 B |
| 4,194,446 | 3/1980 | Palovaara | 100/162 B |
| 4,299,162 | 11/1981 | Hartmann et al. | 100/162 B X |

Primary Examiner—Carl E. Hall
Assistant Examiner—John T. Bortch
Attorney, Agent, or Firm—Ostrolenk, Faber, Gerb & Soffen

[57] ABSTRACT

A press roller, with adjustable bending characteristics, has a hollow roller shell which rotates around a fixed yoke. The shell is supported at each end by a self-aligning bearing. The press roller forms a pressure nip with a counter roller. Along this pressure nip, there is a semi-circular main pressure chamber arranged between the yoke and the roller shell, the length of which is equal to the length of the pressure nip. Adjoining this main pressure chamber there are provided at each end of the roller shell, a respective semi-circular additional pressure chamber. With a view to the bending characteristics of the yoke in the operation of the press roller, the axial and circumferential seals defining each additional pressure chamber are arranged on a respective annular shaped seal support. The latter support is supported by studs so that it may tilt on the yoke and shift axially with respect to the yoke.

32 Claims, 3 Drawing Figures

PRESS ROLLER WITH ADJUSTABLE BENDING CHARACTERISTICS

BACKGROUND OF THE INVENTION

The invention relates to a press roller with adjustable bending characteristics, especially for use in the paper industry, and comprising a hollow roller shell rotatable about a stationary support device including a yoke. The roller shell is adapted to cooperate with a counter roller to define a pressure nip which receives a web of paper. The axes of rotation of the two rollers and the pressure nip lie in a pressure plane.

A roller of this kind is known from DE-OS No. 30 03 395, which corresponds to U.S. Pat. No. 4,307,501. There, a hydraulic supporting device transmits supporting forces from a fixed yoke onto a rotatable roller shell. The supporting device comprises an annulus situated between the roller shell and the yoke. The annulus is divided by two axially extending seals into two semi-circular pressure chambers which are arranged symmetrically with respect to the plane of pressure. One pressure chamber faces the counter roller and may be supplied with a higher pressure than the other pressure chamber. The differential pressure between the two pressure chambers determines the course (or distribution) of the pressure in the pressure nip between the press roller and the counter roller. Altering the differential pressure alters the distribution of the line of nip pressure, corresponding to the natural bending lines of the press roller and the counter roller. A correcting device for localized alteration of the supporting forces comprises individual pistons positioned in the annulus between the yoke and roller shell, and preferably in the end areas of the press roller. In the inner area of the pistons, essentially only atmospheric pressure prevails. In this way, additional bending moments may be exerted on the roller shell. It is thereby possible to arbitrarily alter the bending line of the roller shell.

This known roller has some disadvantages, however. In contrast to older, known constructions, in which only the pressure chamber facing the counter roller is acted upon by a pressure medium, it is necessary to supply both pressure chambers with a pressure medium. A relatively high pump pressure is necessary, which implies high energy consumption. A further complication is that the aforementioned pistons cause additional friction and unequal heating of the shell over its breadth in the axial direction. Another disadvantage is that the pistons must be located in clearances in the yoke. These clearances reduce the stiffness and the firmness of the yoke.

SUMMARY OF THE INVENTION

The object of the invention is to provide a press roller which avoids the above disadvantages of the known roller construction. It is especially desired to provide a roller which works with the lowest possible hydraulic pressure.

Another object is to provide a press roller which uses additional pressure chambers axially outboard of the main pressure chamber.

A further object of the invention is to provide such additional pressure chambers which are effectively sealed during use of the press roller and during deflection of the support or yoke thereof under operating pressure.

In the press roller according to the invention, the roller comprises a hollow roller shell supported on a stationary support device comprising a yoke. The roller shell is supported at bearings at its ends. Support means support the shell on the yoke so as to cause the shell to apply pressure to the counter roller at the pressure nip. The support means may comprise the conventional hydraulic main supporting device, discussed above.

For correcting the force exerted by the roller shell and adjusting the pressure along the pressure nip, an additional pressure chamber is provided at at least one and more usually at both ends of the press roller and axially outboard of the main pressure chamber. The additional pressure chambers are also directed to face toward the counter roller with which the press roller cooperates. More particularly, on each end of the roller, an additional supporting device is located between the hydraulic main supporting device, which is preferably in the form of the aforementioned semi-annular pressure chamber, and the associated bearing, which serves as a support for the roller shell agaist the yoke. Each additional supporting device has the form of a curvedly shaped, preferably semi-circular pressure chamber. That chamber is acted upon by a pressure medium, independently of the main pressure chamber. The additional pressure chambers cause the desired optional additional bending of the ends of the press roller toward the middle areas of the roller shell. By reason of the semi-circular shape of the additional pressure chambers, only a relatively low hydraulic pressure is necessary there. Moreover, it becomes unnecessary to apply pressure medium to the semi-circular chamber which is opposite the main pressure chamber of the main support device. In this way, even in the main pressure chamber, the hydraulic pressure can be relatively low.

In constructing the additional supporting devices as semi-circular pressure chambers, which have to be limited by axial and circumferential seals, considerable difficulties arise. It is usual to find in the operation of the press roller a strong degree of bending of the yoke and a corresponding inclination of the yoke toward the roller shell at the ends of the roller. To maintain the seal of the additional pressure chambers, the axial and circumferential seals for each additional pressure chamber are carried on a respective curvedly shaped, and particularly annular, seal support located in the additional pressure chamber and spaced radially inwardly from the shell to define the additional pressure chamber between the shell and the seal support. The annular seal support extends in the inner part of the roller shell in a circumferential direction around the yoke. The seal support is supported in the pressure plane, that is in the direction in which pressure is applied by the counter roller, while permitting the seal support to otherwise move with respect to the stationary support device or yoke. The seal support is fixed to the yoke in such a way that it can apply to the yoke the supporting force exerted by the additional pressure chamber. The seal support is thereby fixed in the direction of the pressure plane relative to the yoke, but apart from that, the seal support may move freely toward the yoke. The seal support may slide axially with respect to the yoke and it is also pivotally supported at the yoke for being able to incline around an axis perpendicular to the pressure plane.

The position of the seal support in relation to the roller shell is free to alter during operation of the press roller essentially only in the direction of the pressure plane. An axial shift (of a value worth mentioning) or an inclination of the seal support in relation to the roller shell does not take place. It is especially advantageous that the seal support may be displaced axially in relation to the yoke and/or is inclinable around an axis perpendicular to the pressure plane. Even with a strong inclination of the yoke with respect to the shell under strong counter roller pressure, the seals on the seal support can lie adjacent to the respective abutting surfaces in the press roller. This construction also permits movement of thermal expansion between the yoke and the roller shell. A further advantage is that in the construction of the seals and the parts appertaining to them, relatively large manufacturing tolerances can be allowed and the sealing arrangement can be assembled without difficulty.

The circumferential seals in each additional pressure chamber have essentially the same measurements, for avoiding axial shift resulting from pressurizing of the additional pressure chambers. This is of significance when both the additional pressure chambers are acted upon by pressures of varying level. This is necessary, when one wishes to achieve an asymmetrical line pressure profile over the length of the pressure nip.

The main support for the roller shell with respect to the yoke comprises a hydraulic supporting device, which itself comprises a main pressure chamber defined between the roller shell and the yoke. The main pressure chamber also is defined by axially extending, circumferentially spaced apart, axial seals that define circumferential limits of the main pressure chamber. The main pressure chamber may also be substantially semi-circular in shape, with the main pressure facing toward the counter roller. Furthermore, the main pressure chamber has its axial limits defined by circumferential seals at the axial ends of the main pressure chamber. The circumferential seals of both the main pressure chamber and the additional pressure chambers abut in each case against a respective counter surface that completes their seal. The counter surfaces are defined on a buffer disc. This method of construction of the circumferential seals, known in itself, can also be used in association with the above-described characteristics. In this way, a flexibility of movement of the seal support is achieved by having the sealing strips protrude only slightly from their locating grooves. Thus, the greatest possible ease of movement of the sealing strips in their locating grooves is achieved.

The buffer discs for the counter surfaces are heat insulated from the roller shell. In this way, the heat from the friction produced by the sliding of the circumferential seals over the buffer discs is kept as far away as possible from the roller shell. Otherwise, the shell would be unevenly heated along its length. To further reduce the spreading of the heat from the buffer discs onto the roller shell, pressure fluid, which has been heated up by the buffer discs, can leak out of the pressure chamber, and it is subsequently replaced by a flow of cool pressure fluid.

BRIEF DESCRIPTION OF THE DRAWINGS

By way of example, a specific embodiment of the invention will now be described, with reference to the accompanying drawings, in which.

DESCRIPTION OF A PREFERRED EMBODIMENT

Figure 1:
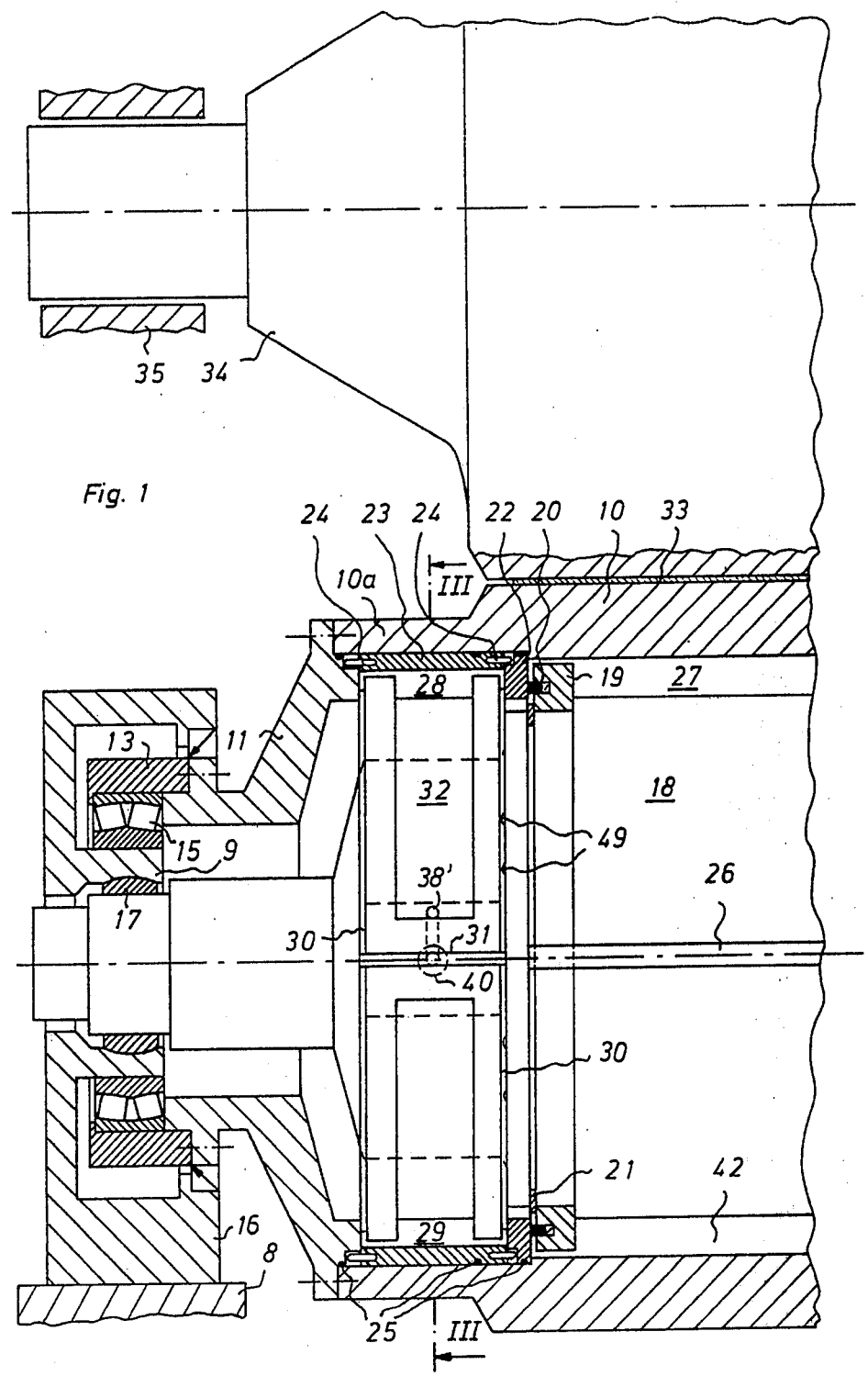
FIGS. 1 and 2 show a press roller having adjustable bending characteristics, in longitudinal section, FIG. 1 showing the end of the roller at the so-called controlling side of the paper machine and FIG. 2 showing the opposite driving end of the press roller.
Figure 2:
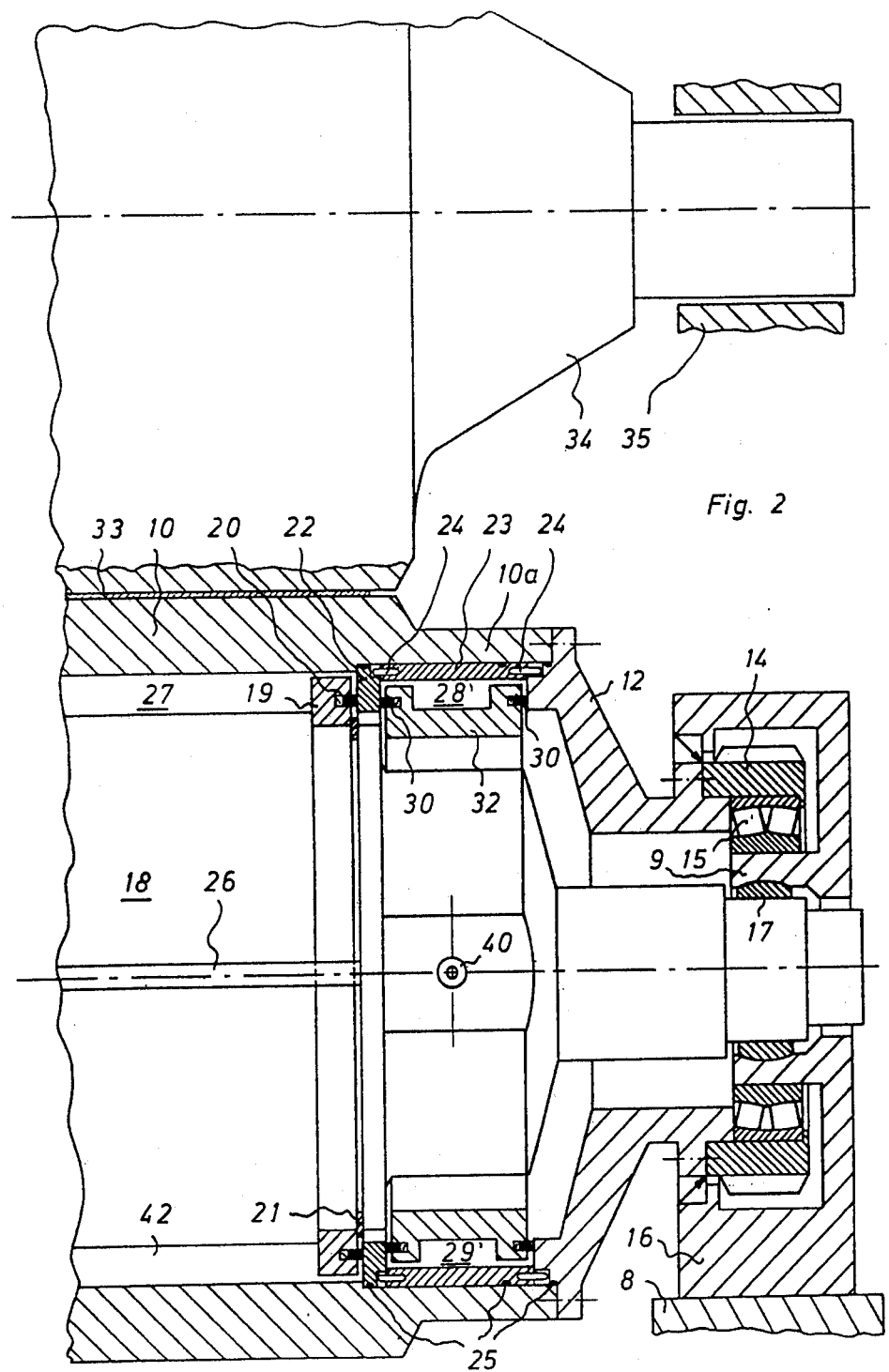

Referring to FIGS. 1 and 2, the press roller has a revolving roller shell 10. On the opposite ends of the roller shell, caps 11 and 12 are fixed, having bearing rings 13 and 14. The bearing ring 14 on the driving side is constructed like a spur gear. It forms part of the drive of the roller shell 10 and meshes with a drive pinion (not visible in the Figures). In each of the bearing rings 13 and 14, a self-aligning roller bearing 15 is arranged whose inner ring rests on a tubular collar 9 of a support block 16. Both support blocks 16 are fixed to a firm framework 8 or to movable pressure levers. A rigid non-revolving yoke 18 extends through the whole length of the roller shell 10, narrows toward its ends and rests in bearings 17 in the support blocks 16.

The roller shell 10, together with a counter roller 34, defines a pressure nip, through which a web of paper 33 passes. The counter roller 34 rests in bearings 35 which are only illustrated schematically.

Annular shaped holders 19 are fixed onto the yoke 18 with the help of spring washers 21. The holders 19 house circumferentially extending sealing strips 20. These sealing strips 20 extend over the area facing the counter roller 34 over half the circumference of the yoke 18. They can be constructed as semi-circular rings or polygonally from straight pieces. The holders 19 are secured against dislocation from the yoke 18. The sealing strips 20 are pressed, with the aid of springs (not shown), in the direction of the axis of the rollers, against buffer discs 22. The discs 22 are spaced axially from the roller caps 11 and 12 via casings 23 and they are secured against dislocation with the aid of studs 24.

Moreover, axially extending strips 26 are arranged in the yoke 18. These are elastically urged outwardly in the direction against the roller shell. The circumferential sealing strips 20 and the axial sealing strips 26 define a semi-circularly shaped main pressure chamber 27, which can be filled with pressure fluid. Seals 25 prevent seepage or leakage of pressure fluid.

On the end of the press roller at the controlling side, additional pressure chambers 28 and 29 are provided between the buffer disc 22 and the roller cap 11. Corresponding additional pressure chambers 28' and 29' are provided on the end of the roller on the drive side between the buffer disc 22 and the roller cap 12. As a result, there are two semi-circularly shaped additional pressure chambers 28 and 28', which are at the side of the roller directed toward the counter roller 34, and two additional pressure chambers 29 and 29', which are arranged on the side of the press roller remote from the counter roller 34. Each of these additional pressure chambers 28, 28', 29, 29' is limited by respective circumferential sealing strips 30 and axial sealing strips 31. Like the axial sealing strips 26 of the main pressure chamber, the axial sealing strips 31 of the additional pressure chamber lie in a plane perpendicular to the plane of pressure.

Figure 3:
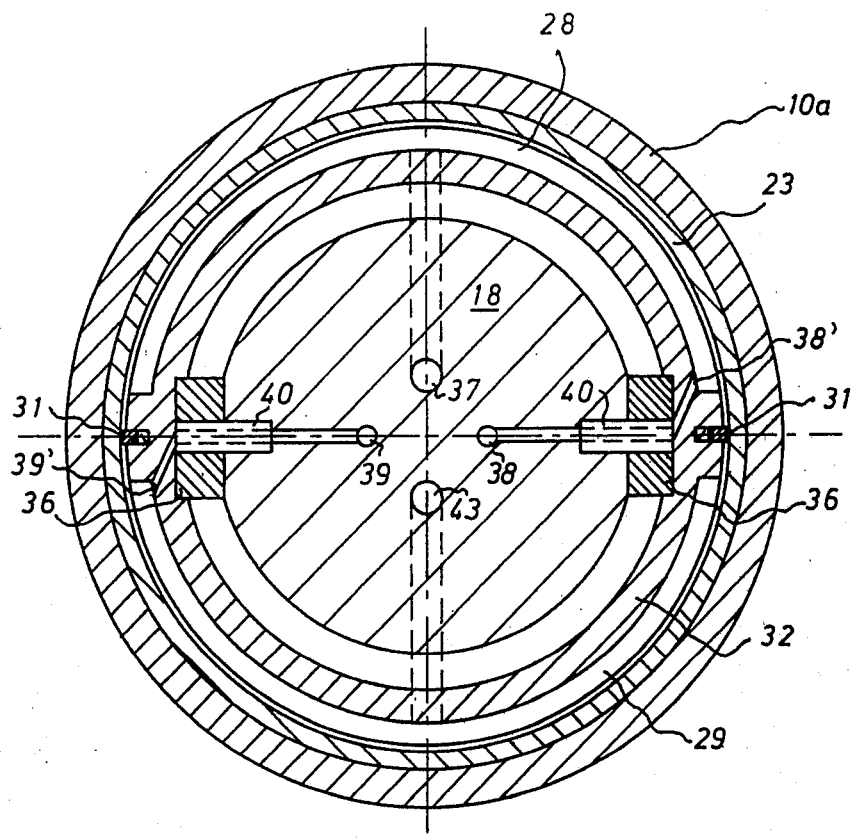
FIG. 3 is a cross-section through the press roller on line III—III of FIG. 1.

The sealing strips 30 and 31 of the additional pressure chambers 28, 29, 28', 29' are mounted in annular supports 32 (see FIG. 3). To locate the support 32 adjacent to the yoke 18, a number of elements are provided. In the area of the axial seals 31, studs 40 are set into the yoke 18. On each of these studs 40 a rotatable square section slide block 36 is arranged. Each seal support 32 has two axial grooves, into which the slide blocks 36 fit. In this way, the seal support 32 can slide in the direction of the axis of rotation of the roller in relation to the yoke 18. Moreover, it can be swiveled around the studs 40. As a result, it does not participate in the inclination of the yoke 18 in relation to the roller shell 10.

FIG. 3 also shows different pressure fluid channels, which all come from the controlling end of the yoke 18. Channel 37 discharges directly into the main pressure chamber 27. Channels 38 and 39 which lead to the additional pressure chamber 28 and 29 lead through the studs 40. An inclined connecting channel 38' or respectively 39' joins onto this. The intermediate area 42 lying opposite the main pressure area 27 is essentially under atmospheric pressure and is connected to the outside via a leakage or seepage channel 43. The additional pressure chambers 28' and 29' on the drive side have as a rule separate pressure fluid inlets. If the need should arise, both pressure chambers 28 and 28' could be subjected to different pressures. The same is true for both pressure chambers 29 and 29'.

In FIG. 1, small seepage apertures 49 can be provided in the seals 30, through which hot pressure fluid can pass. Similar seepage apertures can even be provided in the circumferential seals 20.

Preferably, the axial distance between the sliding surfaces of both the buffer discs 22, the discs to which the seals 20 are adjacent, is approximately equal to the width of the web of paper 33 measured axially of the roll (see FIGS. 1 and 2). The additional pressure chambers 28, 28', 29, 29' lie outside the width of the web of paper. The roller shell 10 has corresponding extensions 10a on each end.

However, the invention is not restricted to the details of the foregoing embodiment and one can diverge from this preferred method of construction. Instead of being axially outboard of the axial breadth of the web, the additional chambers can have part of their width within the width of the web of paper. In this way, the length of the roller shell can be somewhat reduced.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A press roller with adjustable bend characteristics, comprising:
    a stationary support device;
    a hollow roller shell rotatable about a rotation axis about the stationary support device and being adapted to cooperate with a counter roller to define a pressure nip for a web of paper, or the like, to pass through; the nip and the shell axis lying on a pressure plane; a respective bearing at each end of the roller shell and located axially outside the nip for supporting the shell for rotation around the shell axis;
    shell support means for supporting the shell on the stationary support device for transmitting supporting forces from the stationary support device to the shell for causing the shell to apply pressure to the counter roller at the nip;
    a force correcting device for altering the supporting forces on the shell; the correcting device being positioned between the shell support means and at least one of the shell bearings, and that device comprising a curvedly shaped pressure chamber curving partially around the shell at the side of the shell facing toward the counter roller; means for pressurizing the pressure chamber;
    axially extending, circumferentially spaced apart, axial seals defining the curved shape and circumferential limits of the pressure chamber and axially spaced apart circumferentially extending seals defining the axial limits of the pressure chamber;
    a curvedly shaped seal support in the presure chamber and being spaced radially in from the shell to define the pressure chamber; the seal support supporting the circumferential seals and the axial seals of the pressure chamber thereon; means for supporting the seal support in the pressure plane, while permitting the seal support to otherwise move with respect to the stationary support device while the circumferential and the axial seals retain their seal of the pressure chamber.

2. The press roller of claim 1, wherein the stationary support device comprises a yoke extending axially and inside the roller shell and the means for supporting the seal support in the pressure plane comprises the yoke.

3. The press roller of claim 2, wherein the shell support means comprise a hydraulic supporting device between the shell and the yoke.

4. The press roller of claim 3, wherein the hydraulic supporting device comprises a curvedly shaped main pressure chamber defined between the roller shell and the yoke at the side of the shell facing toward the counter roller;
    axially extending, circumferentially spaced apart, second axial seals define the circumferential limits of the main pressure chamber, and axially spaced apart, circumferentially extending, second circumferential seals define the axial limits of the main pressure chamber.

5. The press roller of claim 4, further comprising a second curvedly shaped main chamber also curving partially around the shell at the side thereof facing away from the counter roller; the second axial seals and the second circumferential seals also defining the shape and the circumferential and axial limits of the second main chamber.

6. The press roller of claim 4, wherein the force correcting device further comprises a second curvedly shaped pressure chamber also curving partially around the shell at the side thereof facing away from the counter roller; the first mentioned axial seals and the first mentioned circumferential seals also defining the shape and limits of the second pressure chamber.

7. The press roller shell of claim 6, further comprising second means for pressurizing the second pressure chamber and being adapted to pressurize the second pressure chamber at a different pressure than the first pressure chamber.

8. The press roller of claim 6, further comprising a second curvedly shaped main chamber also curving partially around the shell at the side thereof facing away from the counter roller; the second axial seals and the second circumferential seals also defining the shape and the circumferential and axial limits of the second main chamber.

9. The press roller of claim 4, wherein in the region of the second circumferential seals, leakage apertures are provided for hydraulic fluid in the main pressure chamber to leak past the second circumferential seals.

10. The press roller of claim 4, wherein the second circumferential seals are urged outwardly axially upon pressurizing of the main pressure chamber; a respective buffer disc being disposed beyond each of the second circumferential seals and between the circumferential seal and the respective pressure chamber axially outboard thereof; the buffer discs each defining a counter surface against which the respective second circumferential seals press.

11. The press roller of claim 10, wherein the buffer discs rotate along with the roller shell.

12. The press roller of claim 11, further comprising a respective intermediate casing with a roller cap fixed to the shell for each buffer disc, and the buffer disc being connected to the roller shell via the respective intermediate casing, for securing the buffer disc against dislocation with respect to the shell.

13. The press roller of claim 11, wherein the buffer discs are heat insulated from the roller shell.

14. The press roller of claim 10, wherein the buffer discs are heat insulated from the roller shell.

15. The press roller of claim 4, wherein the axial seals of the pressure chamber seal against the roller shell.

16. The press roller of claim 15, wherein the axial seals of the main pressure chamber seal against the roller shell.

17. The press roller of claim 4, wherein the axial seals of the main pressure chamber seal against the roller shell.

18. The press roller of claim 2, wherein the seal support is axially slidable with respect to the yoke.

19. The press roller of claim 18, wherein the seal support is supported inside the shell for being inclinable around an axis that is perpendicular to the pressure plane.

20. The press roller of claim 19, further comprising support studs extending between the yoke and the seal support for supporting the seal support to incline with respect to the yoke.

21. The press roller of claim 2, wherein the axial seals of the pressure chamber seal against the roller shell.

22. The press roller of claim 1, wherein the shell supporting means comprises a hydraulic supporting device between the shell and the stationary support device.

23. The press roller of claim 22, wherein the seal support is supported inside the shell for being inclinable around an axis that is perpendicular to the pressure plane.

24. The press roller of claim 1, wherein the seal support is axially slidable with respect to the yoke.

25. The press roller of claim 1, wherein the pressure chamber is semi-circularly shaped.

26. The press roller of claim 1, wherein there is a respective said force correcting device at each end of the roller shell.

27. The press roller of claim 26, wherein the circumferential seals of each pressure chamber have essentially the same measurements, for avoiding axial shift from pressurizing of the pressure chambers.

28. The press roller of claim 1, wherein in the region of the circumferential seals, leakage apertures are provided for hydraulic fluid in the pressure chamber to leak past the second circumferential seals.

29. The press roller of claim 1, wherein the force correcting device further comprises a second curvedly shaped pressure chamber also curving partially around the shell at the side thereof facing away from the counter roller; the axial seals and the circumferential seals also defining the shape and limits of the second pressure chamber.

30. The press roller of claim 29, wherein the seal support is annularly shaped.

31. The press roller of any of claims 1, 2, 4, 6, 19, 22 or 29, wherein the shell support means extends axially along the entire nip.

32. In combination, the press roller of any of claims 1, 2, 4, 19 or 24, and a counter roller including a counter shell for engaging the press roller shell at a nip and the counter roller being supported for rotation about an axis parallel to the axis of the roller shell; the counter roller and press roller being oriented so that the nip defined by them is a common pressure plane with the press roller axis.

* * * * *